US009426206B2

(12) United States Patent
Wang et al.

(10) Patent No.: US 9,426,206 B2
(45) Date of Patent: Aug. 23, 2016

(54) FTP DATA TRANSMISSION IN STACK SYSTEM

(71) Applicant: Hangzhou H3C Technologies Co., LTD., Hangzhou, Zhejiang (CN)

(72) Inventors: Yi Wang, Beijing (CN); Wei Wang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 228 days.

(21) Appl. No.: 14/372,823

(22) PCT Filed: Mar. 25, 2013

(86) PCT No.: PCT/CN2013/073121
§ 371 (c)(1),
(2) Date: Jul. 17, 2014

(87) PCT Pub. No.: WO2013/143427
PCT Pub. Date: Oct. 3, 2013

(65) Prior Publication Data
US 2014/0379832 A1    Dec. 25, 2014

(30) Foreign Application Priority Data

Mar. 30, 2012  (CN) .......................... 2012 1 0091670

(51) Int. Cl.
*G06F 15/16*    (2006.01)
*H04L 29/08*    (2006.01)
*H04L 12/931*   (2013.01)

(52) U.S. Cl.
CPC ............. *H04L 67/06* (2013.01); *H04L 49/602* (2013.01); *H04L 49/70* (2013.01)

(58) Field of Classification Search
CPC ........................... H04L 49/70; H04L 49/602
USPC .................................................. 709/203, 201
See application file for complete search history.

(56) References Cited

U.S. PATENT DOCUMENTS 6,339,785 B1 * 1/2002 Feigenbaum ........... H04L 29/06
709/213
6,826,195 B1 * 11/2004 Nikolich ............. H04Q 11/0478
370/400

(Continued)

FOREIGN PATENT DOCUMENTS

CN    1794663    6/2006
CN    101217411  7/2008

(Continued)

OTHER PUBLICATIONS

International Search Report and Written Opinion dated Jun. 27, 2013 issued on PCT Patent Application No. PCT/CN2013/073121 dated Mar. 25, 2013, The State Intellectual Property Office, the P.R. China.

*Primary Examiner* — Hieu Hoang
(74) *Attorney, Agent, or Firm* — Mannava & Kang, P.C.

(57) ABSTRACT

According to an example, a file transfer protocol data transmission method applied in a stack system includes an FTP server master process receiving a file transfer request from an FTP client, for a file requested by the file transfer request, the FTP server master process judging whether the file and the FTP server master process are in a same chassis, when the file and the FTP server master process are not in the same chassis, the FTP server master process sends a file transfer notice to an FTP server slave process running on a chassis which is in the stack system and which the file is in.

15 Claims, 5 Drawing Sheets

(56) References Cited

U.S. PATENT DOCUMENTS

| | | | |
|---|---|---|---|
| 7,225,244 B2* | 5/2007 | Reynolds | G06F 1/14 |
| | | | 709/203 |
| 7,254,636 B1* | 8/2007 | O'Toole, Jr. | G06F 17/30067 |
| | | | 707/999.008 |
| 7,895,298 B1* | 2/2011 | Murray | G06F 17/30017 |
| | | | 709/219 |
| 8,654,680 B2* | 2/2014 | Subramanian | H04L 45/58 |
| | | | 370/255 |
| 2003/0120822 A1* | 6/2003 | Langrind | H04L 29/1232 |
| | | | 709/251 |
| 2005/0021705 A1 | 1/2005 | Jurisch | |
| 2005/0262148 A1* | 11/2005 | Davitt | G06Q 10/00 |
| 2006/0092832 A1 | 5/2006 | Santoso et al. | |
| 2008/0059996 A1* | 3/2008 | Wang | H04H 60/95 |
| | | | 725/32 |
| 2009/0094252 A1* | 4/2009 | Wong | H04L 67/06 |

FOREIGN PATENT DOCUMENTS

| | | |
|---|---|---|
| CN | 102130817 | 7/2011 |
| CN | 102148845 | 8/2011 |
| CN | 102244669 | 11/2011 |
| CN | 102316035 | 1/2012 |
| CN | 102647465 | 8/2012 |

* cited by examiner

| FLAG field | Type field | File identifier field | Port identifier field of client used for data link |
|---|---|---|---|
|  |  |  |  |

Figure 4

FTP DATA TRANSMISSION IN STACK SYSTEM

CROSS-REFERENCE TO RELATED APPLICATION

The present application is a 371 application of International Application No. PCT/CN2013/073121 filed on Mar. 25, 2013 and entitled "FTP Data Transmission in Stack System," which claims benefit of Chinese Patent App. No. CN 201210091670.X filed on Mar. 30, 2012.

BACKGROUND

File Transfer Protocol (FTP) is a universal protocol used to transfer files between an FTP server and an FTP client, and is described in detail in RFC 959. FTP can be applied in a stack system. The stack system refers to a system consisting of multiple chassis devices (called "chassis" for short). In the stack system, one chassis is selected as a master chassis according to a preset selection principle, and the other chassis are regarded as slave chassis. An FTP server master process runs on the master chassis, and an FTP server slave process runs on one of the slave chassis.

BRIEF DESCRIPTION OF THE DRAWINGS

Features of the present disclosure are illustrated by way of example and not limited in the following figure(s), in which like numerals indicate like elements, in which:

FIG. 4 is a schematic diagram illustrating a socket format provided in one example of the present disclosure.

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Figure 1:
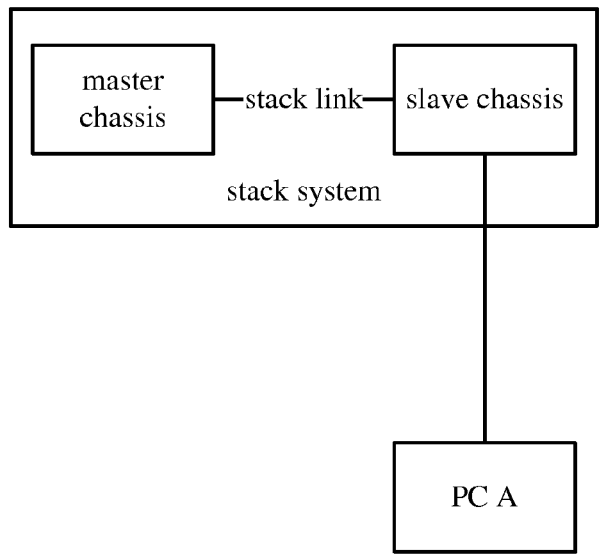
FIG. 1 is a network diagram illustrating an FTP applied to a stack system.

FIG. 1 is a network diagram illustrating an FTP applied to a stack system. Referring to FIG. 1, a PC A, as an FTP client, is connected to a slave chassis in a stack system; an FTP server master process runs on a master chassis, and an FTP server slave process runs on the slave chassis. Under normal circumstances, the FTP server master process is in working condition, while the FTP server slave process, as a backup of the FTP server master process, is in a standby state.

As shown in FIG. 1, if the PC A tries to acquire a file xxx.log stored in the slave chassis, the PC A first sends a file download request to the FTP server master process. When the FTP server master process receives the file download request sent by the PC A, the FTP server master process finds that the file requested by the PC A is in the slave chassis. Since the FTP server slave process in the slave chassis is in the standby state and does not work, the FTP server master process acquires the file xxx.log from the slave chassis through a stack link, such as an Intelligent Resilient Framework (IRF) link between the master chassis and the slave chassis. The FTP server master process transmits the acquired file xxx.log back to the slave chassis through the stack link, such as the IRF link between the master chassis and the slave chassis, and the slave chassis then forwards the acquired file xxx.log to the PC A.

It can be seen from the above described procedure that the PC A acquires the file xxx.log, the stack link between the master chassis and the slave chassis is frequently occupied in the procedure. For example, the FTP server master process acquires the file xxx.log from the slave chassis through the stack link, such as the IRF link between the master chassis and the slave chassis, and transmits the acquired file xxx.log back to the slave chassis through the stack link, such as the IRF link between the master chassis and the slave chassis. This causes an increase of interactive packets on the stack link between the master chassis and the slave chassis, which increases packet pressure on the stack link and results in an increased risk of stack split.

Embodiments of the present disclosure will be explained hereinafter in detail with reference to the accompanying drawings as well as examples.

Two kinds of links will be established when a file is transmitted between an FTP server and an FTP client: one is a control link for transmission of FTP control information, and the other is a data link for transmission of files. Based on an initiator of a data connection, the data link can be established in one of an active mode and a passive mode. The active mode means that the FTP server actively initiates a data connection when establishing a data link, while the passive mode means that the FTP client actively initiates a data connection when establishing a data link.

A method for transmitting FTP data applied in a stack system provided in one example of the present disclosure is to modify establishment of a data link in the case of a file transfer request, and makes no changes in the control link and establishment of data links in other cases. The establishment of the data link can use the active mode, and can also use the passive mode, and this is not specifically limited in one example of the present disclosure.

Besides, in one example of the present disclosure, the file transfer request can be a file download request or a file upload request. The file download request here can be a single file/batch file download request, and the file upload request here can be a single file/batch file upload request.

The method provided in one example of the present disclosure will be described in below.

Figure 2:
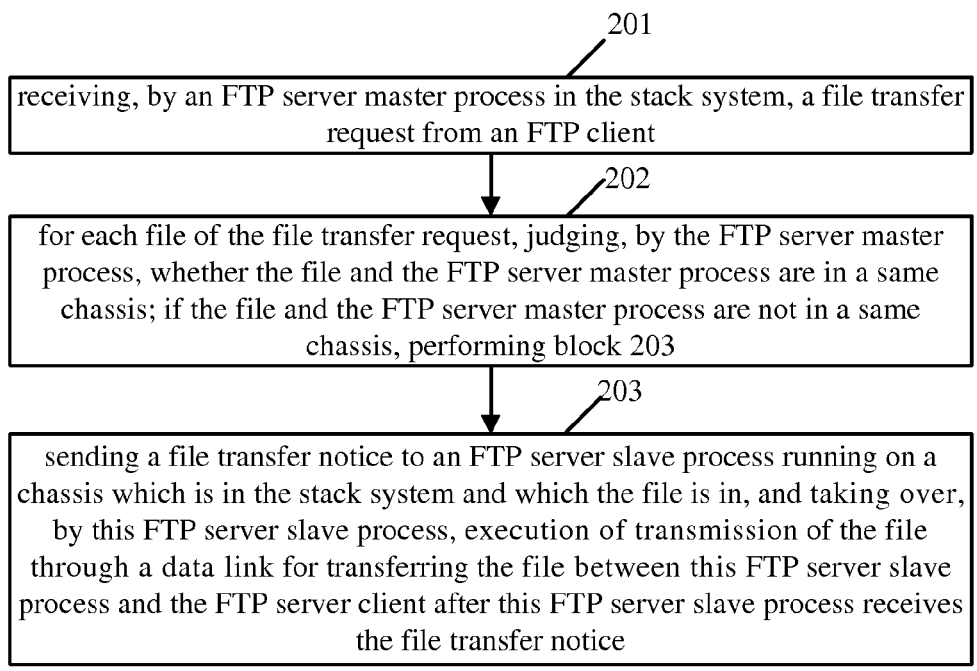
FIG. 2 is a flow chart of a method provided in one example of the present disclosure.

FIG. 2 is a flow chart of a method provided in one example of the present disclosure. The flow can be applied to a stack system. Referring to FIG. 2, the flow can include following blocks:

Block 201: receiving, by an FTP server master process in the stack system, a file transfer request from an FTP client. The file transfer request can be a file download request or a file upload request.

Block 202: for each file of the file transfer request, judging, by the FTP server master process, whether the file and the FTP server master process are in a same chassis. If the file and the FTP server master process are not in a same chassis, performing block 203.

If a judgment result of the block 202 is yes, it shows that the file and the FTP server master process are in a same chassis, and the FTP server master process can directly perform transmission of the file. For example, the FTP server master process can directly perform the transmission of the file according to an existing manner of performing transmission of files by an FTP server master process.

If the judgment result of the block 202 is not, it shows that the file and the FTP server master process are not in a same chassis. For example, the file is in a slave chassis of the stack system while the FTP server master process is in the master chassis of the stack system. If the file is transmitted according to the existing file transmission manner, it will result in the stack link between the master chassis and the slave chassis being frequently occupied to transmit file, thereby increasing packet pressure on the stack link. In order to avoid this problem, the block 203 is performed in one example of the present disclosure.

Block 203: sending, by the FTP server master process, a file transfer notice to an FTP server slave process running on a chassis which is in the stack system and which the file is in, and taking over, by this FTP server slave process, execution of transmission of the file through a data link for transferring the file between this FTP server slave process and the FTP server client after this FTP server slave process receives the file transfer notice.

That is to say, in one example of the present disclosure, when the file to be transferred and the FTP server master process are not in the same chassis, the transmission of the file will not be executed by the FTP server master process. Instead of the FTP server master process, the transmission of the file will be executed by the FTP server slave process in the chassis that has the file. Compared this with the existing file transfer manner, the problem that the stack link between the slave chassis and the master chassis being frequently occupied to transmit files will not appear, and the pressure on the stack link will be reduced.

The flow shown in FIG. 2 will be described in details by taking a file download request as an example of the file transfer request. The principle of a file upload request is similar.

Figure 3:
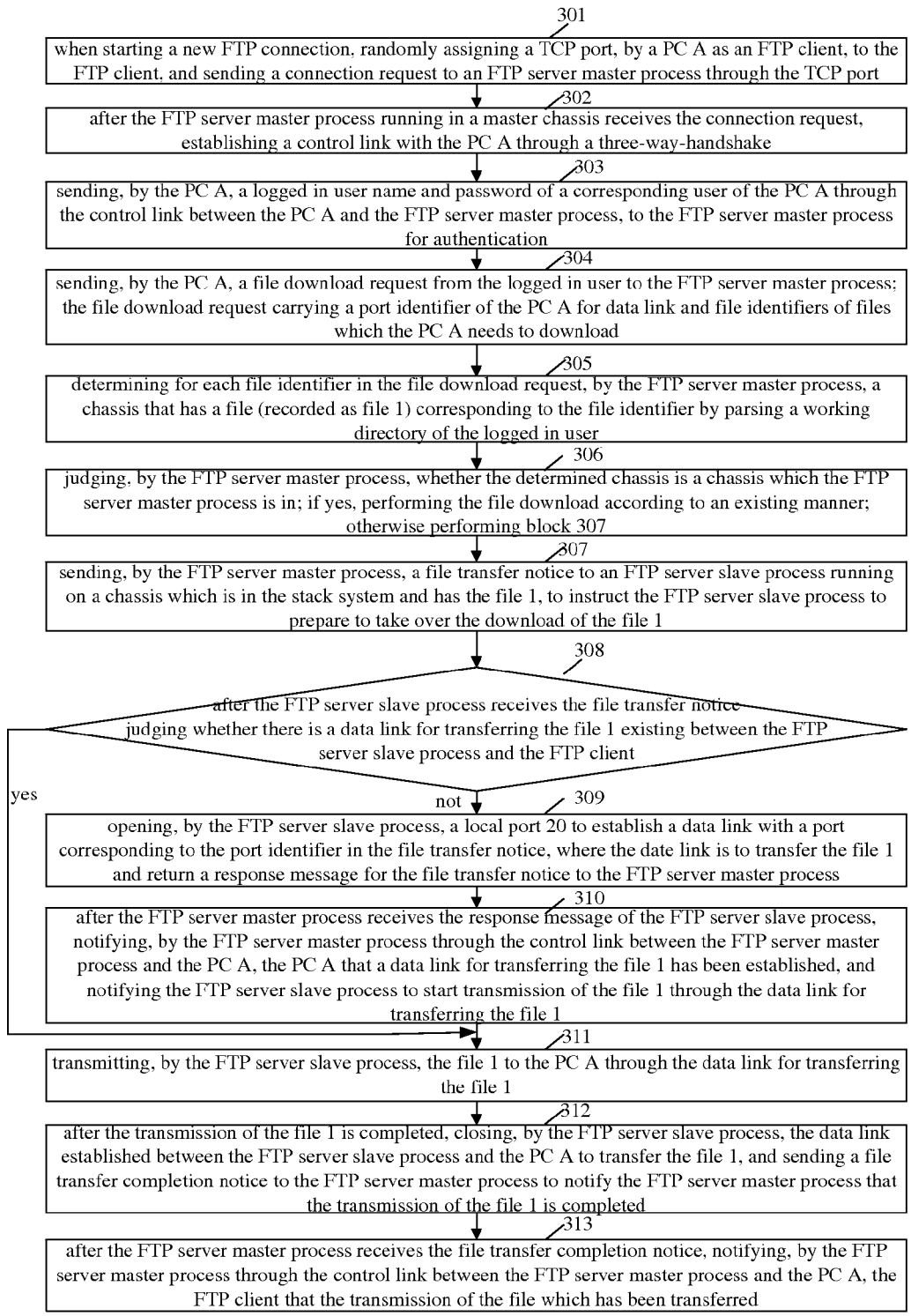
FIG. 3 is a detailed flow chart of a method provided in one example of the present disclosure.

FIG. 3 is a detailed flow chart of a method provided in one example of the present disclosure. The flow can be applied in the network shown in FIG. 1. As shown in FIG. 3, the flow can include following blocks.

Block 301: when starting a new FTP connection, randomly assigning a transmission control protocol (TCP) port, by a PC A as an FTP client, to the FTP client, and sending a connection request to an FTP server master process through the TCP port.

Block 302: after the FTP server master process running in a master chassis receives the connection request, establishing, by the FTP server master process, a control link with the PC A through a three-way-handshake.

Block 303: sending, by the PC A, a logged in user name and password of a corresponding user of the PC A through the control link between the PC A and the FTP server master process to the FTP server master process for authentication.

After the logged in user name and password sent by the PC A pass authentication, it shows that the corresponding user of the PC A has successfully logged in the FTP server master process. Accordingly, the user can be called a "logged in user."

The above blocks 301 to 303 are preparation work of the PC A and the FTP server master process before the file download request is sent. The preparation work can also include other blocks which will not be described here since they have little relation with the example of the present disclosure.

Block 304: sending, by the PC A, a file download request from the logged in user to the FTP server master process. The file download request carries a port identifier of the PC A for data link and file identifiers of files which the PC A is to download.

Block 305: determining for each file identifier in the file download request, by the FTP server master process, a chassis that has a file (recorded as file 1) corresponding to the file identifier by parsing a working directory of the logged in user.

In the block 305, determining a chassis that has a file (recorded as file 1) corresponding to the file identifier by parsing a working directory of the logged in user can include: judging whether the file identifier carries a chassis identifier of a chassis that has the file corresponding to the file identifier; if yes, directly determining a chassis corresponding to the carried chassis identifier as the chassis that has the file (recorded as file 1) corresponding to the file identifier and then performing following block 306; otherwise, determining a chassis that has a file (recorded as file 1) corresponding to the file identifier by parsing a working directory of the logged in user.

Furthermore, in one example of the present invention, the FTP server master process can use serial mode to handle requests from the FTP client. That is, the FTP client sends a request and the FTP server master process handles or aborts the request before the FTP client can send a next request. A request described here refers to an operation viewed from the user and it may not be a single command. A request may correspond to multiple commands and multiple responses. Taking a file renaming request as an example, after the user has inputted a file name before modification and a modified file name in the FTP client, the FTP client first sends a RENAME FROM (RNFR) command carrying the file name to be modified, and then sends a RENAME TO (RNTO) command carrying the modified file name. The file renaming request is completed when the FTP server master process has responded to both of the two commands.

Based on this, in the block 305, no matter if the file download request is a single file download request or a batch file download request, the file download request may carry multiple file identifiers. Based on this, the FTP server master process will perform the determination operation of the block 305 for each file identifier carried in the file download request.

In addition, when the working directory of the logged in user is located in a chassis of the stack system, then each file identifier of the file download request corresponds to a file located on that chassis.

Block 306: judging, by the FTP server master process, whether the determined chassis is a chassis which the FTP server master process is located; if yes, performing the file download according to an existing manner; otherwise performing block 307.

Block 307: sending, by the FTP server master process, a file transfer notice to an FTP server slave process running on a chassis, which is in the stack system and has the file 1, to instruct the FTP server slave process to prepare to take over the download of the file 1.

The notice carries a port identifier of the PC A for data link and a file identifier of the file 1.

Block 308: after the FTP server slave process receives the file transfer notice, judging, by the FTP server slave process, whether there is a data link for transferring the file 1 existing between the FTP server slave process and the FTP client; if not, performing block 309; if yes, performing block 311.

Block 309: opening, by the FTP server slave process, a local port 20 to establish a data link with a port corresponding to the port identifier in the file transfer notice, where the date link is to transfer the file 1 and return a response message for the file transfer notice to the FTP server master process.

In the block 309, the response message carries the port identifier of the PC A for data link and the file identifier of the file 1.

It can be seen, after executing the block 309, a data link is established to transfer the file 1 between the local port 20 of the FTP server slave process and the port of the PC A corresponding to the port identifier in the file transfer notice.

It should be noted that, in the block 309, using the active mode to establish a data link is taken as an example, and the principle of using the passive mode to establish a data link is similar and will not be repeated here.

Block 310: after the FTP server master process receives the response message of the FTP server slave process, notifying, by the FTP server master process through the control link between the FTP server master process and the PC A, the PC A that a data link for transferring the file 1 has been established, and notifying the FTP server slave process to start transmission of the file 1 through the data link for transferring the file 1. Then, block 311 is performed.

Block 311: transmitting, by the FTP server slave process, the file 1 to the PC A through the data link for transferring the file 1.

Block 312: after the transmission of the file 1 is completed, closing, by the FTP server slave process, the data link established between the FTP server slave process and the PC A to transfer the file 1, and sending a file transfer completion notice to the FTP server master process to notify the FTP server master process that the transmission of the file 1 is completed.

Block 313: after the FTP server master process receives the file transfer completion notice, notifying, by the FTP server master process through the control link between the FTP server master process and the PC A, the FTP client that the transmission of the file has been transferred.

It should be noted, in one example of the present disclosure, in the file transmission procedure of the block 311, the FTP server master process is in a dormant state. When the file transfer completion notice is received, the FTP server master process is wakened again.

With this, the download of the file can be completed through the above blocks.

It should be noted, in the flow shown in FIG. 3, each of the notices sent by the FTP server master process to the FTP server slave process, and the response messages and each of the notices sent by the FTP server slave process to the FTP server master process, are sent via a socket such as an interprocess Socket. The format of the Socket is shown in FIG. 4 and includes: FLAG field, type field, file identifier field, and port identifier field of client for data link.

The FLAG field occupies one byte, and meanings of values of the FLAG field can be: when a value of bit0 is 1, i.e., a value of the FLAG field is 1, it means that the FTP server slave process notifies the FTP server master process of file transmission completion (referred to as "fin"); when a value of bit1 is 1, i.e., a value of the FLAG field is 2, it means that the FTP server master process notifies the FTP server slave process to prepare to take over file transmission (referred to as "syn"); when a value of bit2 is 1, i.e., a value of the FLAG field is 4, it means that the FTP server slave process has responded to the FTP server master process; other bits such as from bit3 to bit7 can be reserved. The type field occupies one byte, and meanings of values of the type field can be: when a value of type field is 1, it means that a data link is established; when a value of type field is 0, it means that the data link is closed. The file identifier field occupies 255 bytes, and is to carry file identifiers and file paths. The port identifier field of client for data link occupies 2 bytes.

Based on FIG. 4, the flow shown in FIG. 3 will be described hereinafter with an example.

Figure 5:
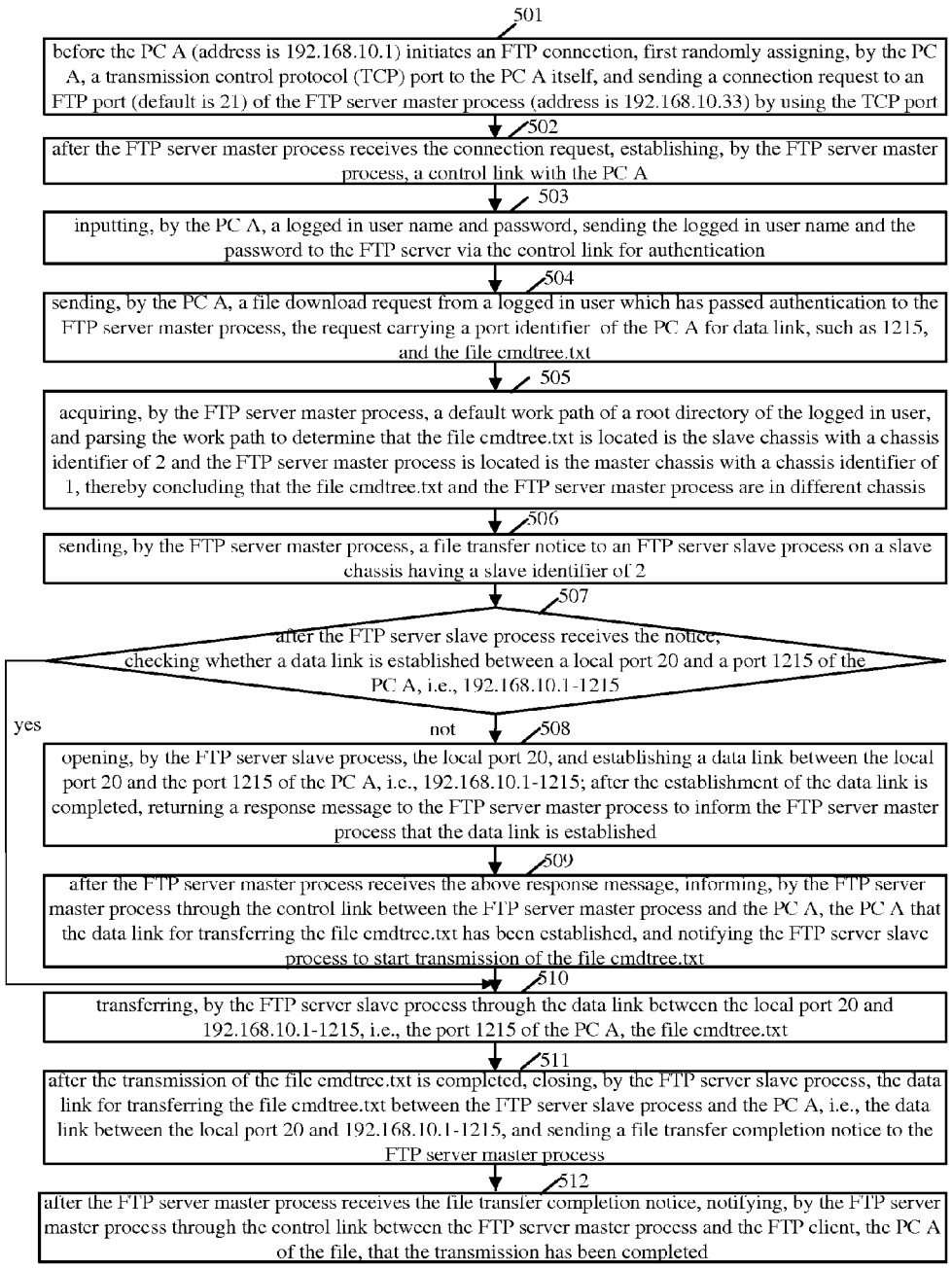
FIG. 5 is a flow chart of an example of the present disclosure.

FIG. 5 is a flow chart of an example of the present disclosure. In FIG. 5, the PC A, as an FTP Client, is directly connected with a slave chassis of a stack system, an FTP server master process runs on a master chassis of the stack system, an FTP server slave process runs on a slave chassis, a PC A tries to download and acquire a file of which a file identifier is cmdtree.txt, and the file is stored in a main control board of the slave chassis. Based on this, as shown in FIG. 5, the flow can include the following blocks.

Block 501: before the PC A (address is 192.168.10.1) initiates an FTP connection, first randomly assigning, by the PC A, a transmission control protocol (TCP) port to the PC A itself, and sending a connection request to an FTP port (default is 21) of the FTP server master process (address is 192.168.10.33) by using the TCP port.

Block 502: after the FTP server master process receives the connection request, establishing, by the FTP server master process, a control link with the PC A.

Block 503: inputting, by the PC A, a logged in user name and password and sending the logged in user name and the password to the FTP server via the control link for authentication.

Block 504: sending, by the PC A, a file download request from a logged in user which has passed authentication to the FTP server master process. The request carries a port identifier of the PC A for the data link, such as 1215, and the file cmdtree.txt.

Block 505: acquiring, by the FTP server master process, a default work path of a root directory of the logged in user, and parsing the work path to determine that the file cmdtree.txt is located is the slave chassis with a chassis identifier of 2 and the FTP server master process is located is the master chassis with a chassis identifier of 1, thereby concluding that the file cmdtree.txt and the FTP server master process are in different chassis.

The FTP server master process can obtain files only in the default work path of the logged in user. If the default work path is a compact Flash (CF) card in the master chassis while the file is in the slave chassis, the FTP server master process first modifies the default work path to be a CF card in the slave chassis according to a working principle of local users.

Block 506: sending, by the FTP server master process, a file transfer notice to an FTP server slave process on a slave chassis having a slave identifier of 2.

Based on FIG. 4, a format of the file transfer notice in the block 506 is shown in Table 1.

TABLE 1

| FLAG field | Type field | File identifier field | Port identifier field of client for data link |
|---|---|---|---|
| 2 | 1 | /cmdtree.txt | 1215 |

Block 507: after the FTP server slave process receives the notice, checking, by the FTP server slave process, whether a data link is established between a local port 20 and a port 1215 of the PC A, i.e., 192.168.10.1-1215; if the data link between the local port 20 and the port 1215 of the PC A is not established, performing block 508; if the data link between the local port 20 and the port 1215 of the PC A is established, performing block 510.

Block 508: opening, by the FTP server slave process, the local port 20, and establishing a data link between the local port 20 and the port 1215 of the PC A, i.e., 192.168.10.1-1215; after the data link is established, returning a response message to the FTP server master process to inform the FTP server master process that the data link is established.

Based on FIG. 4, a format of the response message in the block 508 is shown in Table 2.

TABLE 2

| FLAG field | Type field | File identifier field | Port identifier field of client for data link |
|---|---|---|---|
| 4 | 1 | /cmdtree.txt | 1215 |

Block 509: after the FTP server master process receives the above response message, informing, by the FTP server master process through the control link between the FTP server master process and the PC A, the PC A that the data link for transferring the file cmdtree.txt has been established, and notifying the FTP server slave process to start transmission of the file cmdtree.txt.

In the block 509, a format of the notice which is sent from the FTP server master process to the FTP server slave process may be as shown in the above Table 1.

Block 510: transferring, by the FTP server slave process through the data link between the local port 20 and 192.168.10.1-1215, i.e., the port 1215 of the PC A, the file cmdtree.txt.

Block 511: after the transmission of the file cmdtree.txt is completed, closing, by the FTP server slave process, the data link for transferring the file cmdtree.txt between the FTP server slave process and the PC A, i.e., the data link between the local port 20 and 192.168.10.1-1215, and sending a file transfer completion notice to the FTP server master process.

Based on FIG. 4, a format of the file transfer completion notice in the block 511 is shown in Table 3.

TABLE 3

| FLAG field | Type field | File identifier field | Port identifier field of client for data link |
|---|---|---|---|
| 1 | 1 | /cmdtree.txt | 1215 |

Block 512: after the FTP server master process receives the file transfer completion notice, notifying, by the FTP server master process through the control link between the FTP server master process and the FTP client, the PC A of the file, that the transmission has been completed.

At this point, the description of the flow shown in FIG. 5 has been completed.

In the above flow shown in FIG. 3 or FIG. 5, after the FTP server slave process has closed the data link, the FTP server slave process can notify the FTP server master process through a notice which may use a format shown in Table 4, that the data link has been closed.

TABLE 4

| FLAG field | Type field | File identifier field | Port identifier field of client for data link |
|---|---|---|---|
| 4 | 2 | | 1215 |

Further, in the above flow shown in FIG. 3 or FIG. 5, the FTP server slave process can close the data link established between the FTP server slave process and the PC A to transfer the file 1, after waiting for a set time when the transmission of the file 1 is completed. The waiting set time can specifically be set according to the actual situation, for example, can be immediate, or a certain time such as 1 minute, 30 seconds and so on. An example of the present disclosure does not particularly limit this, or the set time can also be a time when a link closing notice sent by the FTP server master process is received. The FTP server master process can send the link closing notice in following situations: the FTP server master process is wakened again by receiving the file transfer completion notice and determines whether files corresponding to all the file identifiers in the file download request have been downloaded. If the files corresponding to all the file identifiers in the file download request have been downloaded, the FTP server master process sends the link closing notice to the FTP server slave process in a chassis, in which a file corresponding to each file identifier of the file download request is located, to inform the FTP server slave process to close the data link for transferring the file corresponding to the file identifier of the file download request between the FTP server slave process and the PC A. If the FTP server master process determines that files corresponding to some of the file identifiers in the file download request have not been downloaded, for the file identifiers corresponding to the files which have not been downloaded, the above operation of determining a chassis in which a file corresponding to the file identifier is located is repeated.

The method provided in one example of the present disclosure has been described above; an apparatus provided in one example of the present disclosure will be described hereinafter.

Figure 6:
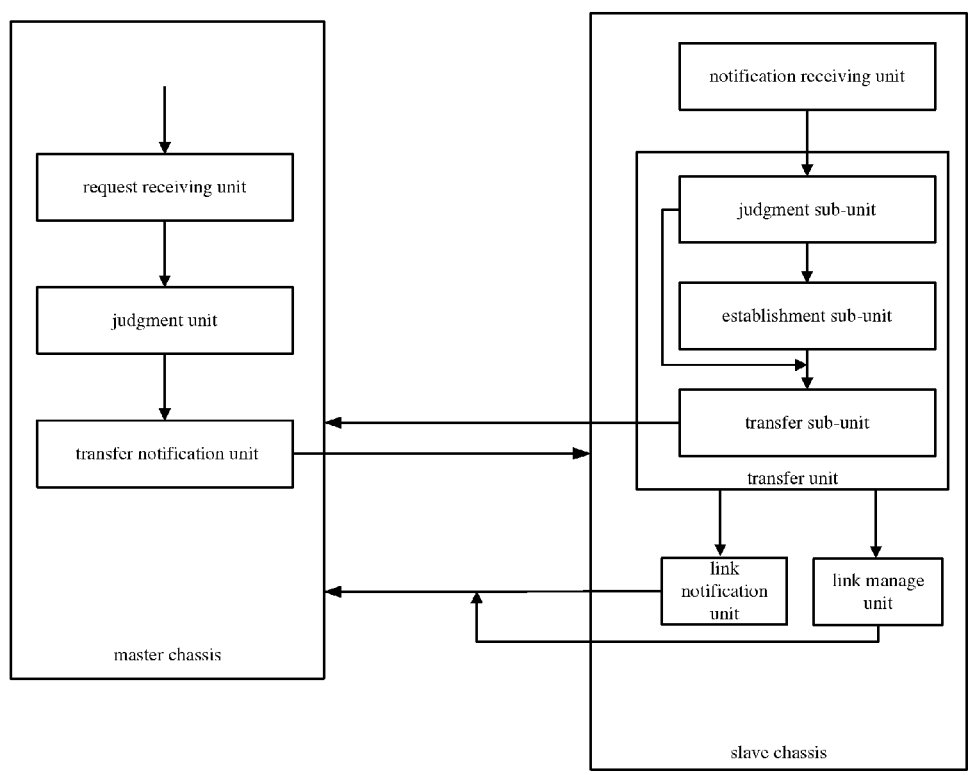
FIG. 6 is a schematic diagram illustrating an apparatus provided in one example of the present disclosure.

Referring to FIG. 6, FIG. 6 is a schematic diagram illustrating an apparatus provided in one example of the present disclosure. As shown in FIG. 6, the apparatus can include: a master chassis and a slave chassis, an FTP server master process runs on the master chassis, and an FTP server slave process runs on the slave chassis.

The FTP server master process includes a request receiving unit, a judgment unit and a transfer notification unit.

The request receiving unit is to receive a file transfer request from an FTP client.

The judgment unit is to, for a file requested by the file transfer request, judge whether the file and the FTP server master process are in a same chassis.

The transfer notification unit is to, when a judgment result of the transfer notification unit is no, send a file transfer notice to an FTP server slave process running on a chassis in the stack system and that has the file.

The FTP server slave process includes a notification receiving unit and a transfer unit.

The notification receiving unit is to receive the file transfer notice from the FTP server master process.

The transfer unit is to, after the notification receiving unit receives the file transfer notice, take over execution of transmission of the file through a data link for transferring the file between this FTP server slave process and the FTP client.

When execution of the file transmission, the transfer unit can include following sub-units:

a judgment sub-unit to judge whether there is a data link for transferring the file existing between the FTP server slave process and the FTP client;

an establishment sub-unit to establish a data link for transferring the file between the FTP server slave process and the FTP client when a judgment result of the judgment sub-unit is no;

a transfer sub-unit to transmit the file through the data link for transferring the file, when a judgment result of the judgment sub-unit is yes or when the establishment sub-unit has established the data link for transferring the file.

In one example of the present disclosure, the FTP server slave process further includes a link notification unit.

The link notification unit is to send a data link establishment completion notice to the FTP server master process, after the establishment sub-unit has established the data link before the transfer sub-unit transmits of the file through the data link established by the establishment sub-unit.

Based on this, the request receiving unit of the FTP server master process further receives the data link establishment completion notice; the transfer notification unit further notifies the FTP client through a control link between the FTP server master process and the FTP client that the data link has been established, after the request receiving unit receives the data link establishment completion notice. The transfer notification unit notifies the transfer sub-unit to start transmission of the file through the data link established by the establishment sub-unit after completing notification of the FTP client that the data link has been established.

Further, in one example of the present disclosure, the FTP server slave process further includes:

a link manage unit to, after the transfer sub-unit completes the file transmission, close the data link for transferring the file between the FTP server slave process and the FTP client, and send a file transfer completion notice to the FTP server master process.

Based on this, the request receiving unit of the FTP server master process further receives the file transfer completion notice. After the request receiving unit receives the file transfer completion notice, the transfer notification unit further notifies the FTP client of the files which have been completely downloaded, through the control link between the transfer notification unit and the FTP client.

In one example of the present disclosure, the notices sent by the FTP server master process to the FTP server slave process and the notices sent by the FTP server slave process to the FTP server master process can be sent via sockets.

In examples of the present disclosure, when the file to be transferred and the FTP server master process are not in the same chassis, the transmission of the file will not be executed by the FTP server master process, and the transmission of the file will be executed by the FTP server slave process in the chassis in which the file is located, instead of the FTP server master process. Compared this with the existing file transfer manner, the problem that the stack link between the slave chassis and the master chassis is frequently occupied to transmit files will not appear, and the pressure on the stack link will be reduced.

The methods, units and apparatus described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

A machine-readable storage medium is also provided, which is to store instructions to cause a machine to execute a method as described herein. Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A file transfer protocol (FTP) data transmission method applied in a stack system, the method comprising:
receiving, by an FTP server master process in the stack system, a file transfer request from an FTP client; and
for a file requested by the file transfer request, judging, by the FTP server master process, whether the file and the FTP server master process are in a same chassis; if the file and the FTP server master process are not in the same chassis:
  sending, by the FTP server master process, a file transfer notice to an FTP server slave process running on a chassis which is in the stack system and which the file is in.

2. The method of claim 1, wherein the method further comprises:
  after the FTP server master process receives a data link establishment completion notice from the FTP server slave process, notifying, by the FTP server master process, the FTP client through a control link between the FTP server master process and the FTP client that the data link has been established;
  after notifying the FTP client that the data link has been established, notifying, by the FTP server master process, the FTP server slave process to start the transmission of the file through the data link.

3. The method of claim 2, wherein the method further comprises:
  after the FTP server master process receives a file transfer completion notice from the FTP server slave process, notifying, by the FTP server master process, the FTP client that the file has been completely transferred, through a control link between the FTP server master process and the FTP client.

4. The method of claim 2, wherein notices sent by the FTP server master process to the FTP server slave process and notices sent by the FTP server slave process to the FTP server master process are sent via sockets.

5. The method of claim 1, wherein when the file and the FTP server master process are in the same chassis, the FTP server master process directly performs the transmission of the file.

6. A file transfer protocol (FTP) data transmission method applied in a stack system, the method comprising:
  receiving, by an FTP server slave process in the stack system, a file transfer notice from an FTP server master process, wherein the file transfer notice instructs the FTP server slave process to take over download of a file which is requested by an FTP client and is in a chassis where the FTP server slave process runs;
  taking over, by the FTP server slave process execution of transmission of the file through a data link to transfer the file between the FTP server slave process and the FTP client after the FTP server slave process receives the file transfer notice.

7. The method of claim 6, wherein the taking over, by the FTP server slave process execution of transmission of the file through a data link to transfer the file between the FTP server slave process and the FTP client after the FTP server slave process receives the file transfer notice comprises:
  judging, by the FTP server slave process, whether the data link to transfer the file exists between the FTP server slave process and the FTP client;
  when the data link to transfer the file exists between the FTP server slave process and the FTP client, directly performing, by the FTP server slave process, the transmission of the file through the existing data link;
  when the data link to transfer the file does not exist between the FTP server slave process and the FTP client, establishing, by the FPT server slave process, the data link to transfer the file between the FTP server slave process and the FTP client and performing the transmission of the file through the established data link.

8. The method of claim 7, wherein after the FTP server slave process has established the data link and before the FTP server slave process executes the transmission of the file through the established data link, the method further comprises:
  sending, by the FTP server slave process, a data link establishment completion notice to the FTP server master process.

9. The method of claim 7, wherein the method further comprises:
  after FTP server slave process completes the transmission of the file, closing, by the FTP server slave process, the data link to transfer the file between the FTP server slave process and the FTP client, and sending a file transfer completion notice to the FTP server master process.

10. A network device acting as a master device in a stack system, the network device comprising:
  a processor for executing a file transfer protocol (FTP) server master process stored in a memory, the FTP server master process comprising:
  a request receiving unit, a judgment unit, and a transfer notification unit; wherein:
  the request receiving unit is to receive a file transfer request from an FTP client;
  the judgment unit is to, for a file requested by the file transfer request, judge whether the file is in the network device;
  the transfer notification unit is to, when a judgment result of the judgment notification unit is no, send a file transfer notice to an FTP server slave process running on a chassis which is in the stack system and which has the file.

11. The network device of claim 10, wherein
  the request receiving unit is further to receive a data link establishment completion notice and a file transfer completion notice from the FTP server slave process;
  the transfer notification unit is further to notify:
    the FTP client through a control link between the network device and the FTP client that a data link has been established to transfer the file between the FTP server slave process and the FTP client after the request receiving unit receives the data link establishment completion notice;
    the FTP server slave process to start transmission of the file through the data link established to transfer the file between the FTP server slave process and the FTP client; and
    the FTP client through the control link between the transfer notification unit and the FTP client that the file has been completely transferred, after the request receiving unit receives the file transfer completion notice.

12. A network device acting as a slave device in a stack system, the network device comprising:
  a processor for executing a file transfer protocol (FTP) server slave process stored in a memory, the FTP server slave process comprising:
  a notification receiving unit and a transfer unit; wherein
  the notification receiving unit is to receive a file transfer notice from an FTP server master process; wherein the file transfer notice instructs the network device to take over download of a file which is requested by the file transfer request and is in a chassis of the network device;
  the transfer unit is to, after the notification receiving unit receives the file transfer notice, take over execution of transmission of the file through a data link to transfer the file between the network device and the FTP client.

13. The network device of claim 12, wherein the transfer unit comprises:
 a judgment sub-unit to judge whether the data link to transfer the file exists between the network device and the FTP client;
 an establishment sub-unit to establish the data link to transfer the file between the network device and the FTP client when a judgment result of the judgment sub-unit is no;
 a transfer sub-unit to execute transmission of the file through the data link used to transfer the file, when the judgment result of the judgment sub-unit is yes or when the establishment sub-unit has established the data link used to transfer the file.

14. The network device of claim 13, wherein the network device further comprises a link notification unit;
 the link notification unit is to send a data link establishment completion notice to the FTP server master process after the establishment sub-unit has established the data link and before the transfer sub-unit executes transmission of the file through the data link established by the establishment sub-unit.

15. The network device of claim 13, wherein:
 the network device further comprises a link manage unit to, after the transfer sub-unit completes transmission of the file, close the data link used to transfer the file between the network device and the FTP client, and send a file transfer completion notice to the FTP server master process.

* * * * *